United States Patent [19]

Sakamoto

[11] Patent Number: 5,398,067
[45] Date of Patent: Mar. 14, 1995

[54] PICTURE DATA PROCESSING APPARATUS

[75] Inventor: Takayuki Sakamoto, Kanagawa, Japan

[73] Assignee: Sony Corporation, Tokyo, Japan

[21] Appl. No.: 31,966

[22] Filed: Mar. 16, 1993

[30] Foreign Application Priority Data

Mar. 17, 1992 [JP] Japan .................................. 4-092077

[51] Int. Cl.$^6$ ........................................ H04N 7/133
[52] U.S. Cl. ...................................... 348/403; 348/420
[58] Field of Search ............. 358/96, 133, 136, 261.3, 358/433; 382/22, 43; H04N 7/133; 348/390, 403, 407, 420

[56] References Cited

U.S. PATENT DOCUMENTS

| | | | |
|---|---|---|---|
| 4,224,678 | 9/1980 | Lynch et al. ........................ | 358/133 |
| 4,242,733 | 12/1980 | Deal .................................. | 358/133 |
| 4,242,734 | 12/1980 | Deal .................................. | 358/133 |
| 4,546,385 | 10/1985 | Anastassiou ........................ | 358/96 |
| 4,933,763 | 6/1990 | Chantelou .......................... | 358/136 |
| 5,148,501 | 9/1992 | Enomoto et al. .................... | 358/22 |

FOREIGN PATENT DOCUMENTS 0442096 8/1991 European Pat. Off. .
2661062 10/1991 France .

OTHER PUBLICATIONS

Rioul, O. and Vetterli, M, "Wavelets and Signal Processing", IEEE Signal Processing Magazine, vol. 8, No. 4, Oct. 1991, pp. 14–38.

Eddins, S. et al., "An Edge Modeling and Reconstruction Approach to Subband Image Coding", IEEE International Symposium on Circuits and Systems, Portland, Ore., May, 1989, pp. 25–28.

Primary Examiner—Tommy P. Chin
Assistant Examiner—Richard Lee
Attorney, Agent, or Firm—Jay H. Maioli

[57] ABSTRACT

A picture data processing apparatus, which is suitably applied, for instance, to a television conference system in which picture data are transmitted in the form of codes prevents, deterioration of the picture quality even if an edge in the picture data exits. In the apparatus, the presence or absence of an edge is detected for each block, and when a block having an edge is detected, a Wavelet transform is employed in transmission of the picture data, whereas a discrete cosine transform is employed when the block has no detected edge.

4 Claims, 9 Drawing Sheets

| X/Y | X1 | X2 | X3 | X4 | X5 | X6 | X7 | X8 |
|---|---|---|---|---|---|---|---|---|
| Y1 | 10 | 11 | 11 | 12 | 10 | 12 | 11 | 11 |
| Y2 | 11 | 10 | 10 | 9 | 11 | 13 | 9 | 8 |
| Y3 | 11 | 9 | 10 | 9 | 10 | 11 | 10 | 11 |
| Y4 | 10 | 10 | 10 | 8 | 10 | 11 | 11 | 11 |
| Y5 | 34 | 34 | 34 | 40 | 33 | 32 | 28 | 16 |
| Y6 | -55 | -84 | -86 | -78 | -69 | -43 | -19 | 10 |
| Y7 | -102 | -99 | -94 | -101 | -108 | -103 | -104 | -95 |
| Y8 | -85 | -86 | -85 | -84 | -88 | -85 | -87 | -97 |

| 0.353553 | 0.353553 | 0.353553 | 0.353553 | 0.353553 | 0.353553 | 0.353553 | 0.353553 |
|----------|----------|----------|----------|----------|----------|----------|----------|
| 0.353553 | 0.353553 | 0.353553 | 0.353553 | -0.353553 | -0.353553 | -0.353553 | -0.353553 |
| 0.500000 | 0.500000 | -0.500000 | -0.500000 | -0.500000 | 0.000000 | 0.000000 | 0.000000 |
| 0.000000 | 0.000000 | 0.000000 | 0.000000 | 0.000000 | 0.500000 | -0.500000 | -0.500000 |
| -0.707107 | 0.000000 | 0.000000 | -0.707107 | 0.707107 | 0.000000 | 0.000000 | 0.000000 |
| 0.000000 | 0.707107 | 0.707107 | 0.000000 | 0.000000 | 0.000000 | 0.000000 | 0.000000 |
| 0.000000 | 0.000000 | 0.000000 | 0.000000 | 0.000000 | -0.707107 | 0.000000 | 0.000000 |
| 0.000000 | 0.000000 | 0.000000 | 0.000000 | 0.000000 | 0.000000 | 0.707107 | -0.707107 |

FIG. 5

| X/Y | X1 | X2 | X3 | X4 | X5 | X6 | X7 | X8 |
|---|---|---|---|---|---|---|---|---|
| Y1 | 0 | 0 | 0 | −1 | 1 | −1 | −1 | −1 |
| Y2 | 0 | 1 | 0 | 1 | −1 | −1 | 2 | 2 |
| Y3 | 1 | 1 | −1 | 1 | 0 | 0 | 1 | 0 |
| Y4 | 3 | 2 | 2 | 6 | 2 | −1 | −2 | 0 |
| Y5 | −18 | −18 | −16 | −20 | −13 | −12 | −9 | 4 |
| Y6 | 20 | 40 | 39 | 30 | 27 | 12 | 4 | −2 |
| Y7 | 16 | 5 | −4 | 0 | 8 | 9 | 21 | 40 |
| Y8 | 1 | 4 | 3 | −3 | −4 | −8 | −10 | 2 |

FIG. 7

| X/Y | X1 | X2 | X3 | X4 | X5 | X6 | X7 | X8 |
|---|---|---|---|---|---|---|---|---|
| Y1 | 21 | −24 | 7 | 23 | −47 | 28 | 17 | −35 |
| Y2 | 3 | −2 | −1 | 5 | −4 | −7 | 31 | −31 |
| Y3 | 7 | −8 | 8 | −6 | 0 | 8 | −22 | 20 |
| Y4 | −8 | 6 | 1 | −2 | −1 | 5 | −3 | 4 |
| Y5 | 5 | −4 | 2 | −4 | 2 | 6 | −9 | 6 |
| Y6 | −7 | 7 | 0 | −4 | 0 | 2 | −3 | 0 |
| Y7 | −1 | −1 | 0 | −1 | 4 | −2 | −2 | 3 |
| Y8 | 1 | −1 | 0 | 3 | 0 | −1 | 1 | 1 |

FIG. 8

| X/Y | X1 | X2 | X3 | X4 | X5 | X6 | X7 | X8 |
|---|---|---|---|---|---|---|---|---|
| Y1 | 20 | 3 | 4 | −6 | −3 | 2 | 5 | −10 |
| Y2 | −16 | 1 | −4 | 5 | 3 | −5 | −3 | 9 |
| Y3 | −2 | −2 | 1 | −2 | −1 | 2 | 0 | 0 |
| Y4 | −2 | 14 | −10 | 16 | −10 | 4 | 4 | 8 |
| Y5 | −2 | 0 | 0 | 3 | 1 | 1 | 1 | 0 |
| Y6 | −2 | −3 | 2 | −1 | −1 | 1 | −2 | 2 |
| Y7 | −68 | −32 | 3 | −20 | 10 | −3 | −8 | −10 |
| Y8 | 27 | −21 | 7 | −14 | 7 | −5 | −3 | −4 |

FIG. 9

| X/Y | X1 | X2 | X3 | X4 | X5 | X6 | X7 | X8 |
|---|---|---|---|---|---|---|---|---|
| Y1 | 24 | −32 | 0 | 16 | −48 | 23 | 32 | −54 |
| Y2 | 0 | 0 | 0 | 0 | 0 | 0 | 32 | 0 |
| Y3 | 0 | −16 | 16 | 0 | 0 | 0 | −38 | 0 |
| Y4 | −16 | 0 | 0 | 0 | 0 | 0 | 0 | 0 |
| Y5 | 0 | 0 | 0 | 0 | 0 | 0 | 0 | 0 |
| Y6 | 0 | 0 | 0 | 0 | 0 | 0 | 0 | 0 |
| Y7 | 0 | 0 | 0 | 0 | 0 | 0 | 0 | 0 |
| Y8 | 0 | 0 | 0 | 0 | 0 | 0 | 0 | 0 |

FIG. 10

| X/Y | X1 | X2 | X3 | X4 | X5 | X6 | X7 | X8 |
|---|---|---|---|---|---|---|---|---|
| Y1 | 24 | 0 | 0 | 0 | 0 | 0 | 0 | 0 |
| Y2 | −16 | 0 | 0 | 0 | 0 | 0 | 0 | 0 |
| Y3 | 0 | 0 | 0 | 0 | 0 | 0 | 0 | 0 |
| Y4 | 0 | 16 | −16 | 16 | 0 | 0 | 0 | 0 |
| Y5 | 0 | 0 | 0 | 0 | 0 | 0 | 0 | 0 |
| Y6 | 0 | 0 | 0 | 0 | 0 | 0 | 0 | 0 |
| Y7 | −72 | −40 | 0 | −24 | 0 | 0 | 0 | 0 |
| Y8 | 24 | −24 | 0 | 0 | 0 | 0 | 0 | 0 |

FIG. 11

| X/Y | X1 | X2 | X3 | X4 | X5 | X6 | X7 | X8 |
|---|---|---|---|---|---|---|---|---|
| Y1 | −7 | −2 | 2 | 2 | −2 | −7 | −8 | −8 |
| Y2 | −3 | −3 | −4 | −6 | −7 | −2 | 8 | 16 |
| Y3 | −6 | 3 | 13 | 16 | 10 | −1 | −10 | −15 |
| Y4 | −1 | 3 | 6 | 7 | 5 | 4 | 7 | 9 |
| Y5 | −20 | −17 | −14 | −15 | −17 | −17 | −13 | −9 |
| Y6 | 25 | 31 | 37 | 38 | 32 | 24 | 17 | 15 |
| Y7 | 11 | 7 | 1 | −5 | −5 | 4 | 19 | 30 |
| Y8 | 6 | 7 | 5 | 0 | −4 | −4 | 0 | 5 |

FIG. 12

| X/Y | X1 | X2 | X3 | X4 | X5 | X6 | X7 | X8 |
|---|---|---|---|---|---|---|---|---|
| Y1 | 1 | 1 | 1 | 1 | 1 | 1 | 1 | 1 |
| Y2 | 1 | 1 | 1 | 1 | 1 | 1 | 1 | 1 |
| Y3 | 1 | 1 | 1 | 1 | 1 | 1 | 1 | 1 |
| Y4 | 1 | 1 | 1 | 1 | 1 | 1 | 1 | 1 |
| Y5 | −24 | −24 | −16 | −16 | −10 | −10 | −1 | −1 |
| Y6 | 32 | 32 | 40 | 40 | 23 | 23 | −2 | −2 |
| Y7 | 6 | 6 | −2 | −2 | 16 | 16 | 24 | 24 |
| Y8 | 6 | 6 | −2 | −2 | −8 | −8 | 0 | 0 |

FIG. 13

| X/Y | X1 | X2 | X3 | X4 | X5 | X6 | X7 | X8 |
|---|---|---|---|---|---|---|---|---|
| Y1 | 17 | 13 | 9 | 9 | 13 | 18 | 18 | 18 |
| Y2 | 14 | 14 | 14 | 16 | 17 | 14 | 3 | −6 |
| Y3 | 18 | 7 | −4 | −6 | 0 | 12 | 21 | 26 |
| Y4 | 14 | 9 | 6 | 7 | 7 | 6 | 2 | 2 |
| Y5 | 36 | 33 | 32 | 35 | 37 | 37 | 32 | 29 |
| Y6 | −60 | −75 | −84 | −86 | −74 | −55 | −32 | −7 |
| Y7 | −97 | −101 | −99 | −96 | −95 | −98 | −102 | −85 |
| Y8 | −90 | −89 | −87 | −87 | −88 | −89 | −97 | −100 |

FIG. 14

| X/Y | X1 | X2 | X3 | X4 | X5 | X6 | X7 | X8 |
|---|---|---|---|---|---|---|---|---|
| Y1 | 9 | 10 | 10 | 10 | 10 | 10 | 9 | 9 |
| Y2 | 10 | 10 | 9 | 9 | 9 | 11 | 10 | 9 |
| Y3 | 11 | 9 | 8 | 9 | 9 | 10 | 10 | 10 |
| Y4 | 12 | 11 | 11 | 13 | 11 | 9 | 8 | 10 |
| Y5 | 40 | 40 | 34 | 36 | 30 | 30 | 20 | 21 |
| Y6 | −67 | −76 | −87 | −88 | −65 | −54 | −13 | 10 |
| Y7 | −92 | -100 | −96 | −99 | -116 | -110 | -107 | −79 |
| Y8 | −90 | −88 | −80 | −85 | −84 | −85 | −97 | −95 |

FIG. 15

PICTURE DATA PROCESSING APPARATUS

FIELD OF THE INVENTION

This invention relates to a picture data processing apparatus, and is applicable to a television conference system in which picture information is encoded into picture data for transmitting, for example.

BACKGROUND OF THE INVENTION

In a conventional picture data processing apparatus of this type, picture information is encoded into picture data so that moving pictures are transmitted with high efficiency.

More specifically, in the conventional apparatus, picture information supplied successively thereto is divided into predetermined blocks, and a motion vector is detected for each block according to a block matching method.

In addition, in the apparatus, the picture data of the preceding frame (coming one frame before) is subjected to motion compensation according to the results of detection of the motion vectors, and the picture data thus subjected to motion compensation is subtracted from the picture data supplied, to provide difference data.

With the apparatus, the quantity of the picture data handled is reduced in comparison with a case where the picture data is directly transmitted by utilizing the interframe correlation of moving images.

The difference data is then subjected to discrete cosine transform and to variable-length coding.

As a result, the amount of data to be transmitted is reduced with respect to higher-order frequency components, and the picture data is efficiently transmitted as much as possible.

The variable-length coded data is transmitted through a predetermined buffer memory, so that moving picture data can be transmitted within permissible transfer rate of a transmission system.

In the case where moving pictures are transmitted by performing the discrete cosine transform block by block, the picture displayed after decoding appears foggy at a block including an edge.

That is, when the picture data are coded in the above described manner, then the resultant picture appears greatly deteriorated in picture quality.

SUMMARY OF THE INVENTION

In view of the foregoing, an object of this invention is to provide a picture data processing apparatus in which, even if an edge exists, deterioration of the picture quality is effectively prevented.

In order to achieve the foregoing object, according to a first aspect of the invention, there is provided a picture data processing apparatus which encodes picture data D1 block by block wherein each block is inputted successively thereto, and transmits the picture data thus encoded, which comprises: a discrete cosine transform circuit 12, 14 and 18 for subjecting the picture data D1 to discrete cosine transform block by block; a Wavelet transform unit 12, 16 and 18 for subjecting the picture data D1 to Wavelet transform; and an edge detecting circuit 10 for detecting the presence or absence of an edge in each block, to output an edge detection result SEL. According to the edge detection result SEL, the output data of the discrete cosine transform circuit 12, 14 and 18 or the output data of the Wavelet transform circuit 12, 16 and 18 is selected and outputted.

In addition, in the apparatus, according to a second aspect of the invention, the Wavelet transform circuit 12, 16 and 18 is a Haar transform circuit 12, 16 and 18 for subjecting the picture data to Haar transform block by block.

In the picture data processing apparatus, the presence or absence of an edge is detected for each block, and the output data of the discrete cosine transform circuit 12, 14 and 18 or the output data of the Wavelet transform circuit 12, 16 and 18 is selected for each block, which allows the Wavelet transform processing to be selected for the edge portion, and the deterioration in picture quality of the edge portion is prevented as much as possible.

In this case, employment of the Haar transform circuit 12, 16 and 18 as the Wavelet transform circuit can simplify the arrangement of the picture data processing apparatus.

According to the invention, the presence or absence of an edge is detected for each block, and when a block including an edge is detected, instead of the discrete cosine transform processing the Haar transform processing is performed in-transmission of the picture data. Hence, with the apparatus, the edge portion is effectively prevented from being deteriorated in picture quality; that is, the moving pictures can be transmitted with high efficiency.

The nature, principle and utility of the invention will become more apparent from the following detailed description when read in conjunction with the accompanying drawings in which like parts are designated by like reference numerals or characters.

BRIEF DESCRIPTION OF THE DRAWINGS

FIG. 5 is a diagram showing a Haar transform matrix;

FIG. 7 is a diagram showing difference data;

FIG. 8 is a diagram showing the results of discrete cosine transform of the difference data;

FIG. 9 is a diagram showing the results of Haar transform of the difference data;

FIG. 10 is a diagram showing the results of quantization of the data of discrete cosine transform;

FIG. 11 is a diagram showing the results of quantization of the results of Haar transform;

FIG. 12 is a diagram showing the results of inverse discrete cosine transform;

FIG. 13 is a diagram showing the results of inverse Haar transform;

FIG. 14 is a diagram showing the results of restoration of the discrete cosine transform; and FIG. 15 is a diagram showing the results of restoration of the Haar transform.

DETAILED DESCRIPTION OF THE INVENTION

Figure 1:
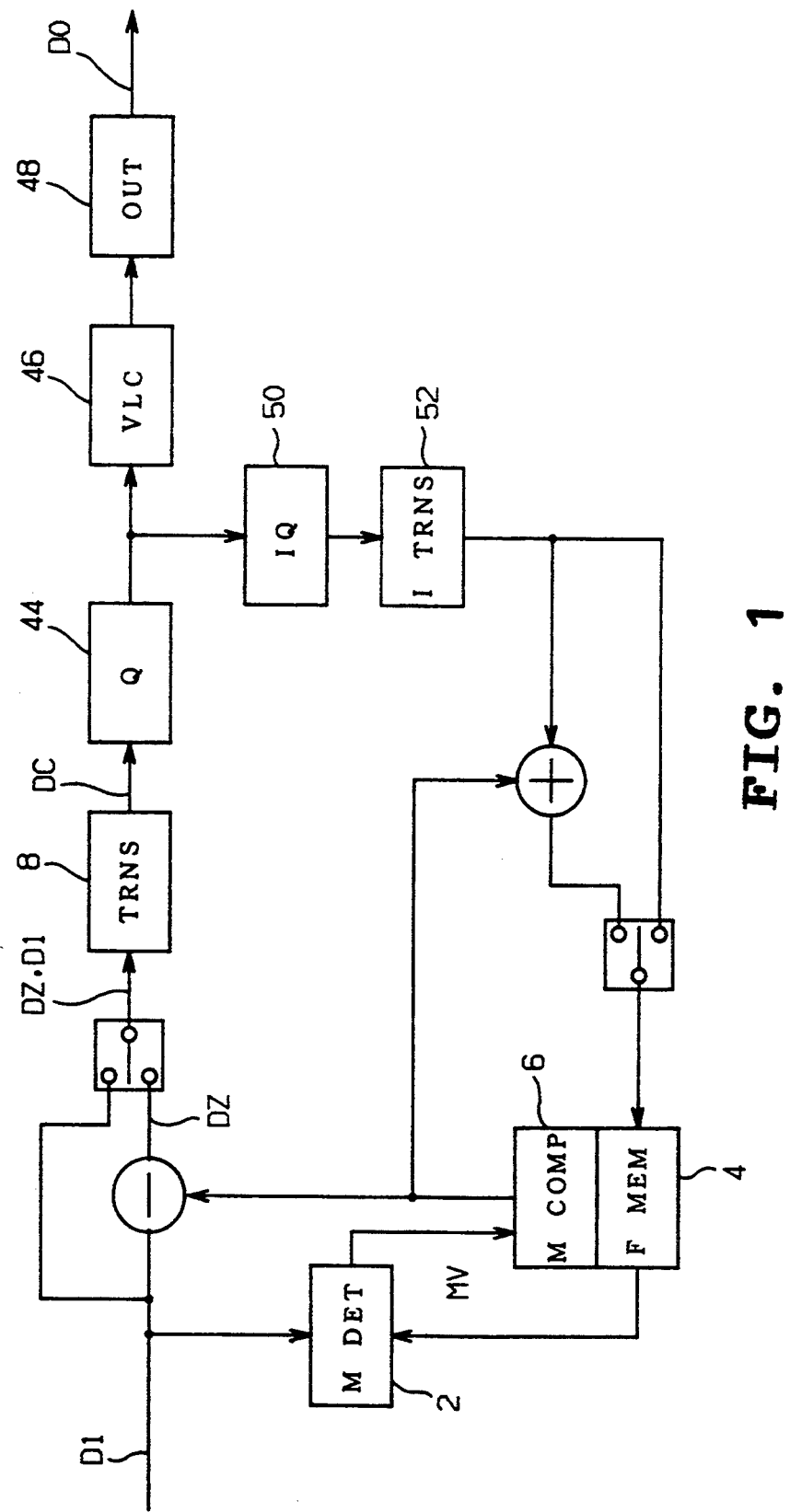
FIG. 1 is a block diagram showing one embodiment of a picture data processing apparatus of this invention.

Preferred embodiments of this invention will be described with reference to the accompanying drawings:

In FIG. 1, a picture data processing apparatus in which video signals inputted successively thereto are subjected to data compression before being transmitted is shown.

That is, in the picture data processing apparatus, a video signal is converted into a digital signal, and thereafter a motion vector MV is detected by a motion detecting circuit 2.

In the motion detecting circuit 2, the input picture data is divided into blocks each having 8×8 picture elements, and a block matching method is employed to detect the motion vector MV of each block BL between a frame memory 4 and the picture data, and the motion vector MV is applied to a motion compensation circuit 6.

The motion compensation circuit 6 selects a block being at a predetermined position corresponding to the detected motion vector MV from the previous frame picture data stored into the frame memory 4, and thereafter successively outputs the block thus selected at the timing which is shifted as much as the motion vector MV.

Picture data of the block unit outputted from the motion compensation circuit 6 is successively subtracted from a digital video signal D1, to generate difference data DZ. Further, an absolute value sum of difference data DZ and an absolute value sum of digital video signal D1 are detected and compared for each block and corresponding to this comparison result, one which requires a lesser amount of data for in transmission is selected from the difference data DZ and the digital video signal D1 for inputting to transform circuit 8.

In response to this selection, in the picture data processing apparatus, an inter-frame coding processing and an intra-frame coding processing are selected to process the digital video signal D1.

A transform circuit 8 encodes the picture data block by block, and outputs them.

In this operation, the transform circuit 8 detects the presence or absence of an edge in each block, and selects a discrete cosine transform conversion or a Haar transform on the basis of the result of detection, so that the edge portion is effectively prevented from being deteriorated in picture quality. This will be described in more detail.

Figure 2:
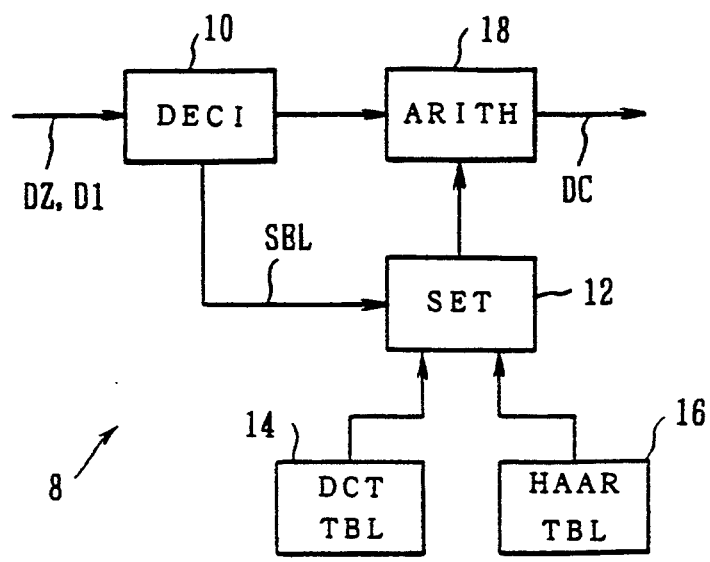
FIG. 2 is a block diagram showing a transform circuit in the apparatus.

That is, as shown in FIG. 2, in the transform circuit 8, input data DZ or D1 is applied to a decision circuit 10, where the presence or absence of an edge is detected for each block.

Figure 3:
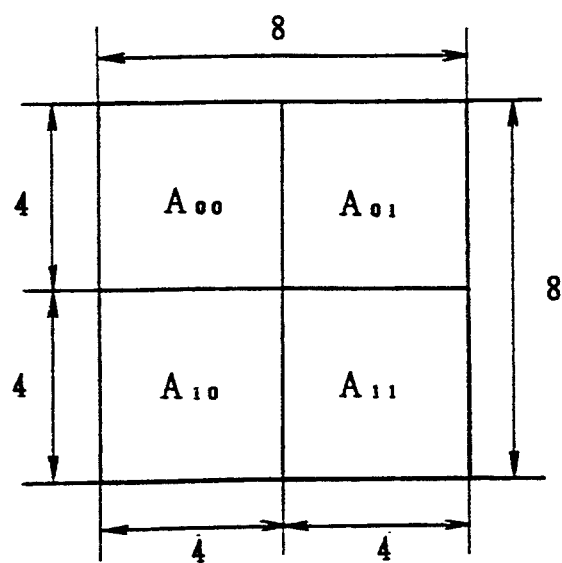
FIG. 3 is an explanatory diagram for a description of an edge detecting operation in the apparatus.

This edge detecting operation is carried out as follows: As shown in FIG. 3, a block consisting of 8×8 picture elements is divided into four parts ("sub-blocks"). For those four sub-blocks, the average values $AVE_{00}$ through $AVE_{11}$ of the input data DZ(D1) are detected, respectively.

That is, for the first sub-block $A_{00}$, the decision circuit 10 performs an arithmetic operation according to the following equation with input data $a_{ij}$ (i=0 to 3, j=0 to 3), to obtain the average value $AVE_{00}$:

$$AVE_{00} = \sum_{i=0}^{3} \sum_{j=0}^{3} a_{ij}/16 \quad (1)$$

Similarly, the average values $AVE_{01}$ through $AVE_{11}$ are detected for the second through fourth sub-blocks $A_{01}$ through $A_{11}$, respectively. Thereafter, for each block, the input data DZ (D1) is subtracted from the average values $AVE_{00}$ through $AVE_{11}$, and the sum of the absolute values of the results of subtraction is obtained.

That is, for the first sub-block $A_{00}$, an absolute value sum $SUM_{00}$ is obtained by the following equation:

$$SUM_{00} = \sum_{i=0}^{3} \sum_{j=0}^{3} |a_{ij} - AVE_{00}| \quad (2)$$

Furthermore, the decision circuit 10 operates to determine whether or not the following relation is established for each sub-block with a predetermined threshold data L as a reference:

$$SUM_{ij} < L \quad (3)$$

In the case where relation (3) is established for none of the sub-blocks, the decision circuit 10 outputs a selection signal SEL to select the Haar transform.

If summarized, the decision circuit 10 operates to detect the presence or absence of an edge in each block, and outputs the selection signal SEL when the edge exists in the block.

The transform circuit 8 further comprises a setting circuit 12, which reads matrix data required for a discrete cosine transform from a discrete cosine transform table 14, and applies the matrix data to an arithmetic circuit 18.

If, in this case, the setting circuit 12 receives the selection signal SEL from the decision circuit 10, the setting circuit 12 stores matrix data from a Haar transform table 16, instead of the discrete cosine transform table 14, and applies the matrix data to the arithmetic circuit 18.

Upon reception of the input data DZ(D1) through the decision circuit 10, the arithmetic circuit 18 subjects the input data DZ(D1) to matrix operation according to the matrix data set by the setting circuit 12, so that the input data DZ(D1) is subjected to the discrete cosine transform or to the Haar transform.

The Haar transform is one kind of Wavelet transform; however, the former is different from the latter in that it is applied to a limited region.

Figures 4, 6:
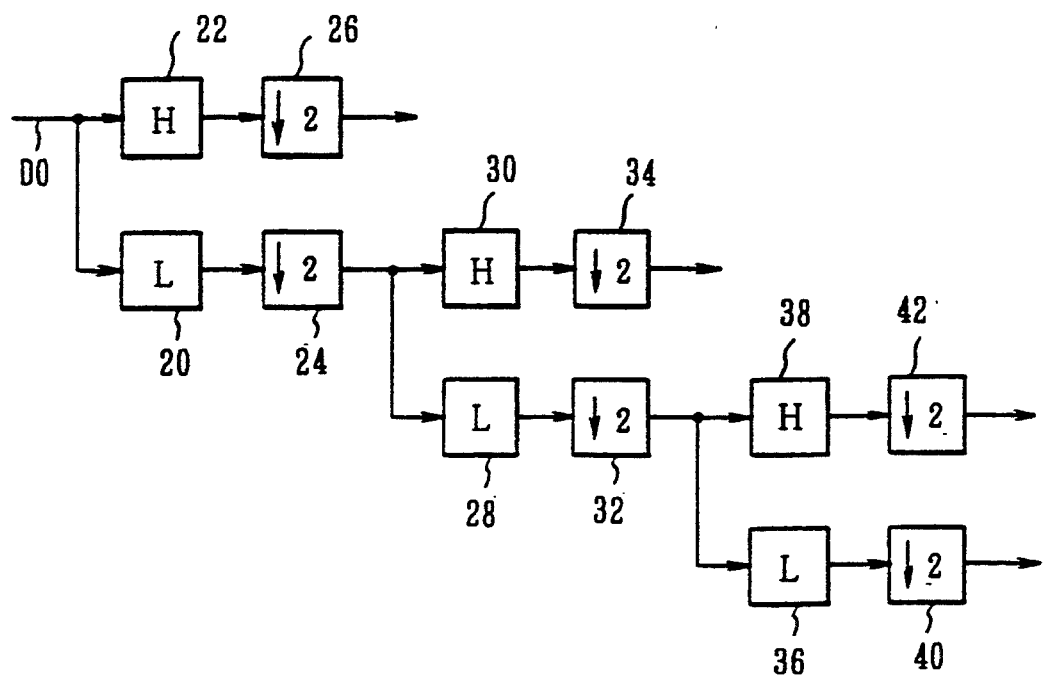
FIG. 4 is a block diagram for a description of a Wavelet transform performed in the apparatus.
FIG. 6 is a diagram showing an original picture used in an experiment.

As shown in FIG. 4, in the Wavelet transform, input data D0 is divided into two signal portions successively, so that the picture data is expanded in a frequency region. This process is lower in data compression rate than the discrete cosine transform; however, it is advantageous in that, with respect to picture data, the position information can be transmitted as well as the frequency information.

In the Wavelet transform, the input data D0 is applied to a QMF (quadrature mirror filter) low-pass filter circuit (L) 20 and a QMF high-pass filter circuit (H) 22; that is, being divided into two signal parts it is applied to two systems, and the output signals of the filter circuits 20 and 22 are applied to thinning circuits (↓2) 24 and 26, where they are thinned to ½.

The output signal of the thinning circuit 24 is applied to a QMF (quadrature mirror filter) low-pass filter circuit 28 and a QMF (quadrature mirror filter) high-pass filter circuit 30; that is, being divided into two signal parts it, is applied to two other systems. The output signals of the filter circuits 28 and 30 are applied to thinning circuits 32 and 34, where they are thinned to ½. The output signal of the thinning circuit 32 is applied to a QMF (quadrature mirror filter) low-pass filter circuit 36 and a QMF (quadrature mirror filter) high-pass filter circuit 38, the output signals of which are applied to thinning circuits 40 and 42, respectively, where they are thinned to ½.

Thus, in the Wavelet transform, picture data is expanded in a frequency region with the position information maintained.

A specific feature of the Wavelet transform resides in that, when it is applied to a block, it is necessary to handle picture data for the blocks around it. Hence, in the embodiment, picture data is processed by using the Haar transform which is achieved with the aimed block only.

That is, in the Haar transform, the arithmetic circuit 18 receives matrix data as shown in a Haar transform matrix of FIG. 5, and subjects the input data DZ(D1) to matrix operation by using the matrix data, thereby to achieve the Haar transform of the input data DZ(D1).

Referring back to FIG. 1, a re-quantizing circuit (Q) 44 re-quantizes the output data DC of the transform circuit 8 according to an adaptive-quantizing method.

The output of the circuit 44 is applied to a variable-length coding circuit (VLC) 46. The variable-length coding circuit 46 variable-length codes the output data of the re-quantizing circuit 44 and an output circuit 48 transmits the output data of the circuit 46 at a predetermined transmission rate.

Thus, by applying the Haar transform to a block including an edge, the position information of the picture data of the edge portion also can be transmitted. Therefore, in this case, the picture data of the edge portion can be transmitted more accurately than in the case where only the discrete cosine transform is effected to transmit the frequency information only.

Hence, by transmitting the picture data with the Haar transform and the discrete cosine transform switched over to each other, the edge portion is effectively prevented from being deteriorated in picture quality; that is, the moving picture can be transmitted with high efficiency.

Picture quality comparison was made with picture data of 8×8 picture elements as shown in FIG. 6, by switching the Haar transform and the discrete cosine transform.

In FIG. 6, reference characters X and Y represent X- and Y-coordinates, respectively, and picture data are represented by 255 gradations with 0 level as the center.

In the picture data processing apparatus, intra-frame coding processing was selected, and the transform circuit 8 was provided difference data DZ as shown in FIG. 7. As is apparent from FIG. 7, an edge in the region encircled by the broken line was detected.

In the picture data processing apparatus, when the difference data was subjected to discrete cosine transform and Haar transform, the results of transform as shown in FIGS. 8 and 9, respectively was obtained. Those results of transform were quantized again, and the results of quantization were as shown in FIGS. 10 and 11, respectively.

The results of quantization were transmitted to a certain transmission system, whereby they were subjected to inverse quantization and inverse transform. The results of inverse transform were as shown in FIGS. 12 and 13, respectively. When those results of inverse transform were decoded and added, the results restored were as shown in FIGS. 14 and 15, respectively.

As is shown in the results of restoration with a broken line, in the case where the discrete cosine transform was selected (FIG. 14), a perceptible deterioration occurred at a flat portion of the original picture; whereas in the case where the Haar transform was selected (FIG. 15), it was seen that the feature of the flat portion remained unchanged.

Thus, by selecting the Haar transform for a block including an edge, the edge portion is effectively prevented from being deteriorated in picture quality, and the moving picture can be transmitted with high efficiency.

In this connection, by utilizing the Haar transform, which belongs to the Wavelet transform, the picture data can be processed block by block, to be simplified in arrangement.

The picture data processing apparatus 1 further includes an inverse re-quantizing circuit (IQ) 50 and an inverse transform circuit 52 as shown in FIG. 1. The circuit 50 operates in FIG. 1 to perform a quantizing process for the output data of the re-quantizing circuit 44 corresponding to the re-quantizing process of the re-quantizing circuit 44 to thereby restore the input data of the transform circuit 8.

The input data thus restored by the inverse transform circuit 52, when it is data by intra-frame coding, is stored directly in the frame memory 4. To the contrary, when it is data by inter-frame coding, the input data restored is added with a picture data motion of the motion compensating circuit 6 and then stored in the frame memory 4.

In this manner, data which is locally decoded output data of re-quantization circuit 44, is stored into the frame memory 4.

In the present embodiment, after the video signal D1 has been converted into a digital signal, the motion vector MV is detected by the motion detecting circuit 2, and predictive picture data is generated by the motion compensating circuit 6 according to the result of motion vector detection.

When intra-frame coding processing is selected, the video signal D1 is applied directly to the transform circuit 8; to the contrary when the inter-frame coding processing is selected, the difference data DZ is applied to the transform circuit 8.

With respect to the video signal D1 and the difference data DZ, the transform circuit 8 detects whether or not each block includes an edge. Depending on the results of detection, the Haar transform is effected for a block including an edge, whereas the discrete cosine transform is effected for a block including no edge.

Thus, the output data of the transform circuit 8 is subjected to re-quantizing by the re-quantizing circuit 44 and to variable-length coding by the variable-length coding circuit 46 before being outputted. For a block including an edge, the Haar transform processing is performed, so that the edge portion is effectively prevented from being deteriorated in picture quantity, in transmission of moving pictures.

With the embodiment as described above, the presence or absence of an edge is detected for each block, and when it is detected that a block includes an edge, the Haar transform processing is performed in transmission of the picture data instead of the discrete cosine transform processing. Thereby, the edge portion is effectively prevented from being deteriorated in picture quality; that is, the moving pictures are transmitted with high efficiency.

In the above-described embodiment, in transmission of picture data, as for a block including an edge the Haar transform processing is performed; however, this invention is not only limited to this but also the Wavelet transform processing may be employed in transmission of picture data.

Furthermore, in the above-described embodiment, the sum of the absolute values of the deviations from the average value is detected for detection of the edge; however, it should be noted that this invention is not only limited to this but also a variety of edge detecting methods may be employed.

While the preferred embodiments of the invention have been described, it will be obvious to those skilled in the art that various changes and modifications may be made therein without departing from the invention, and it is aimed, therefore, to cover all such changes and modifications as fall within the true spirit and scope of the invention.

What is claimed is:

1. A picture data processing apparatus which transmits picture data after being coded for division into a predetermined number of blocks, comprising:
    edge detection means for detecting a presence of an edge in each one of said blocks;
    discrete cosine transform means for discrete cosine transforming said picture data for each one of said blocks of said picture data, when the presence of an edge is not detected by said edge detection means; and
    Wavelet transform means for Wavelet transforming each one of said blocks of said picture data, when the presence of an edge is detected by said edge detection means.

2. The picture data processing apparatus according to claim 1, wherein said Wavelet transform means is comprised of Haar transform means for Haar transforming each one of said blocks of said picture data.

3. A picture data processing method in which picture data is transmitted after being coded for division into a predetermined number of blocks, comprising the steps of:
    detecting a presence of an edge in each one of said blocks;
    discrete cosine transforming said picture data for each one of said blocks, when the presence of an edge is not detected; and
    Wavelet transforming said picture data, when the presence of an edge is detected.

4. The picture data processing method according to claim 3, wherein said Wavelet transform is a Haar transform for each one of said blocks.

* * * * *